UNITED STATES PATENT OFFICE.

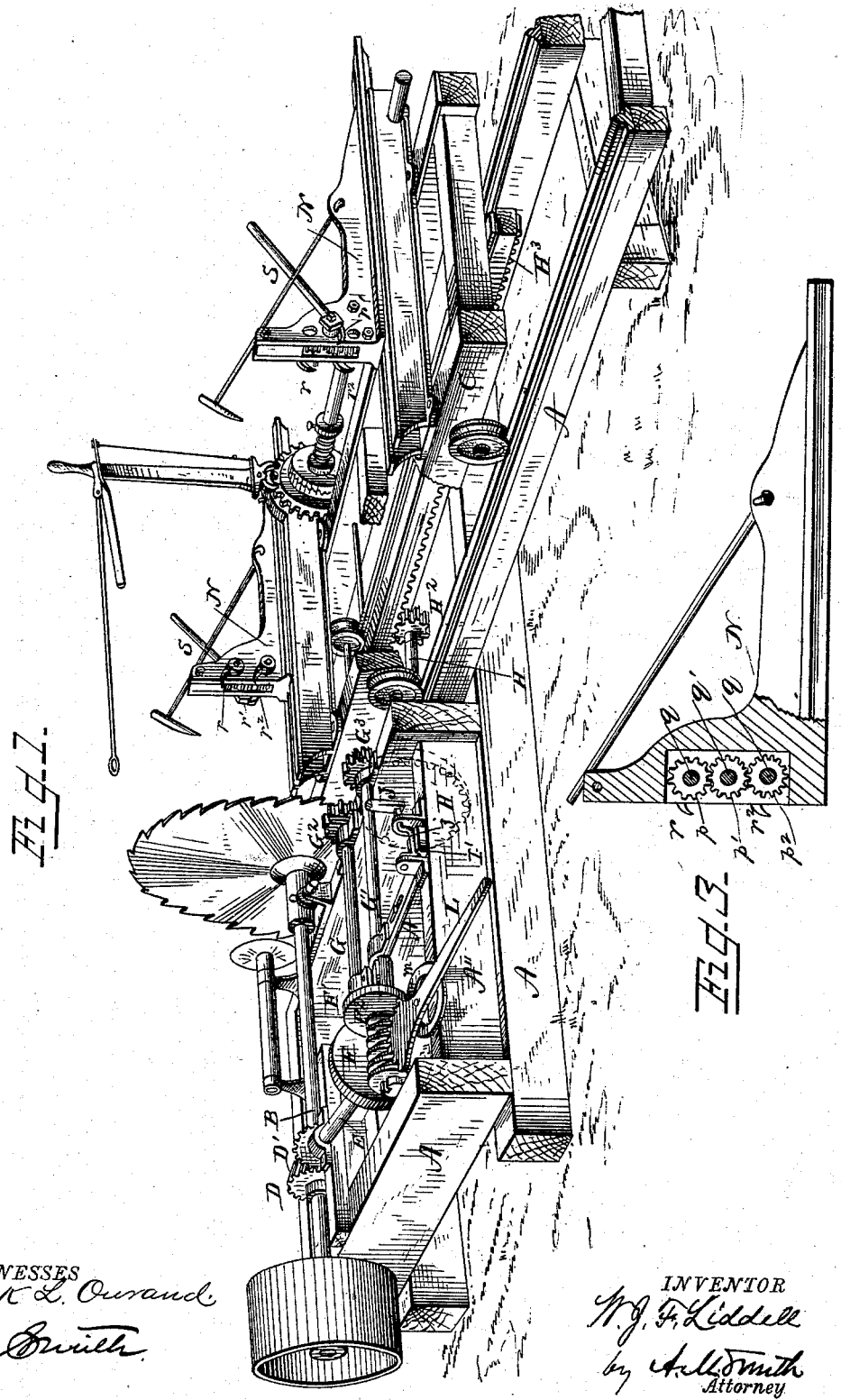

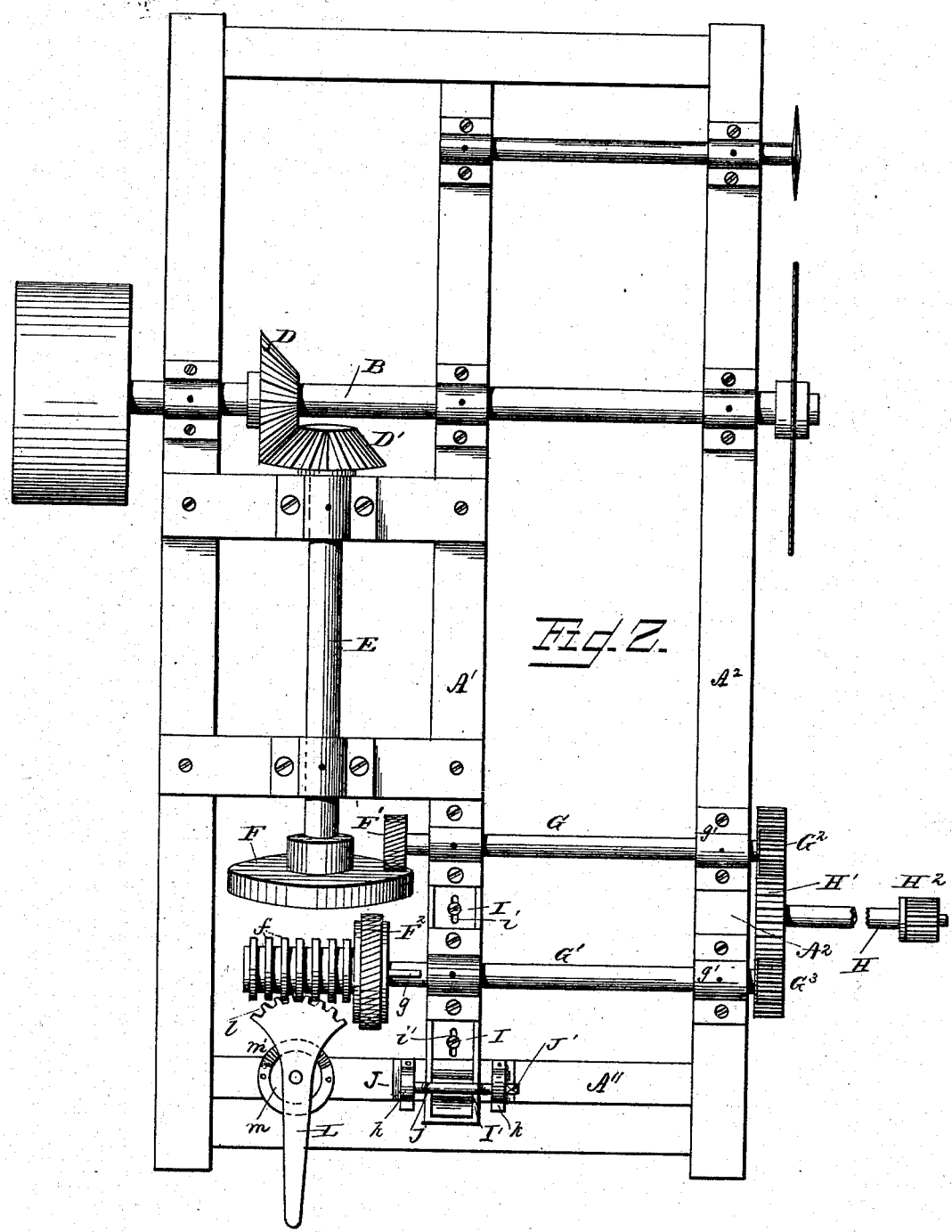

WALTER J. F. LIDDELL, OF CHARLOTTE, NORTH CAROLINA.

CIRCULAR SAW MILL.

SPECIFICATION forming part of Letters Patent No. 274,129, dated March 20, 1883.

Application filed December 9, 1882. (No model.)

*To all whom it may concern:*

Be it known that I, WALTER J. F. LIDDELL, of Charlotte, county of Mecklenburg, State of North Carolina, have invented a new and useful Improvement in Feed and Dogs for Saw-Mills, of which the following is a full, clear, and exact description, reference being had to the accompanying drawings, making part of this specification.

My invention relates to a novel arrangement of friction-feed for saw-carriages and to the dogs applied to the knees or head-blocks of said carriages; and it consists, first, in the combination, with the saw-mandrel, of a second shaft connected with and driven from said mandrel by bevel or miter gears, and having a rotating disk or friction-wheel, and gear-shafts provided with similar disks adapted to be moved into frictional contact with said first-named disk, and arranged on opposite sides thereof, for actuating the saw-carriage in either direction and for varying the speed thereof, as hereinafter explained.

It further consists in a novel manner of gearing the dogs together, whereby the several dogs of each head-block are operated simultaneously, and the opposing dogs moved in opposite directions, as hereinafter explained.

In the accompanying drawings, Figure 1 is a perspective view of the supporting-frame and carriage with my improvements applied. Fig. 2 is a plan view of the same; and Fig. 3 is a vertical transverse section through one of the knees of the head-block, showing the gears for actuating the dogs.

A A' A² represent the supporting-frame, B the saw mandrel or shaft, mounted in suitable bearings thereon, and C the traveling carriage for the material to be operated upon, said parts and the mechanism for actuating the saw-mandrel and saw being of any suitable or preferred construction and arrangement. The mandrel B has secured to it a bevel or miter wheel, D, which engages with and communicates motion to a similar wheel, D', secured to one end of an inclined shaft, E, arranged at right angles to the saw-mandrel in suitable bearings in transverse bars A of the frame, and provided on its opposite or rear end with a friction wheel or disk, F, secured to and rotating with said shaft E.

G and G' are transverse shafts, arranged in transverse vertical planes on opposite sides of the disk F in bearings on the longitudinal frame-timbers A' A², and provided on their ends overlapping said disk on opposite sides with friction-wheels F' and F², adapted to be moved into and out of frictional contact or engagement with the disk F. The shafts G and G' are provided at their ends opposite the friction-wheels with pinions G² G³, both engaging with a spur-gear, H', on the inner end of a transverse shaft, H, which, at its outer or opposite end, is provided with a spur-pinion, H², engaging a rack, H³, on the carriage C for actuating the latter. The wheels F' and F² are by preference made of different diameters, the former being small, and serving, by its rapid rotation when brought into contact with the wheel F, to retract the carriage quickly, and the latter, F², larger, for giving a slower operative feed to the carriage, and adjustable on its shaft G' for adjusting said feed, as hereinafter explained. The bearings of the shafts G and G' on the longitudinal bar A' are applied to a longitudinally-sliding bar or plate, I, secured to said bar A' by headed pins or bolts $i\,i'$, passing through short slots in the bar I, and permitting its longitudinal adjustment. The rear or outer end of the plate or bar I has a lug or ear, I', formed upon or attached to it, provided with a U-shaped notch in its upper end, with which a pendent crank, $j$, on a short transverse shaft, J, engages. The pivotal ends or shaft portion of the crank are mounted in lugs or ears $k$, attached to the transverse frame-bar A'' on opposite sides of the bar I, and the ends or pivots of said shaft extending beyond said lugs. either or both, are squared to receive a socketed lever or wrench, J', by means of which the crank can be rocked for moving the plate I and the ends of the shafts connected therewith forward or backward, for moving either of the wheels F or F² into or out of frictional contact with disk F or to an intermediate position, leaving both wheels F' and F² out of contact therewith, as described. The shaft E terminates in the disk F, and the shaft G', arranged at right angles to shaft E and in the same horizontal plane with the lower end thereof, is extended across the face of the disk F, and is grooved or feathered at $g$ to permit the wheel $F^2$, correspondingly feathered or grooved, to be adjusted lengthwise of the shaft for moving it in toward the center of the disk F or out toward its periphery for varying its speed and the consequent rapidity of feed of the saw-mill carriage C. Thus, as the wheel $F^2$ is moved outward toward the periphery of the disk F, its speed will be increased when engaged therewith, while by moving it inward its speed will be diminished until it reaches the axial center of said disk F, when its motion will cease. The hub of wheel $F^2$ is provided with a series of annular ribs, $f$, forming annular or endless cogs, which engage with the teeth $l$ of a segment formed on the forward end of a horizontal lever, L, pivoted to the transverse frame-bar A″, and by the lateral vibration of which the wheel $F^2$ can be adjusted on its shaft as desired. A flat ring or disk, $m$, is secured to the bar A″ underneath the lever L, and provided near its edge with radial notches or teeth $m'$, which engage corresponding teeth on the lower face of the lever and serve to hold the latter and the wheel F at any desired adjustment.

By adjusting the bar I longitudinally either wheel F′ or $F^2$ can be engaged in frictional contact with the disk F, or both can be removed from contact therewith as desired, and the inner bearings, $g'$, of the shaft are arranged in any convenient manner to accommodate the slight vibration of the shafts G and G′ necessary to provide for such adjustment.

In Fig. 3 one of the knees N of the head-block is shown in vertical transverse section, said knee being slotted transversely or recessed on its forward face to receive pinions or small gears $p$ $p'$ $p^2$, secured to short shafts $q$, mounted in bearings in the side walls of the recess. The gears are of uniform diameter and meshing one with another. Any movement of one imparts a corresponding movement in an opposite direction to the pinion or pinions meshing with it. The shafts of these pinions extend beyond the bearing-walls, and have dogs $r$ $r'$ $r^2$ secured to them by set-screws or in any suitable manner permitting their adjustment. One of the shafts $q'$ has its projecting end squared or otherwise adapted to receive a wrench or socketed lever, S, for the adjustment or partial rotation of the gears and the adjustment of the dogs, as described.

The dogs are set opposing or facing each other on the shafts moving in opposite directions, and their operation in grasping the face of the log or material to be operated upon is similar to those now in use. Parts of the frame, carriage, and mechanism connected therewith not hereinabove particularly described may be constructed in any usual or preferred manner.

I am aware that a rotating face wheel or disk has been employed in combination with friction-wheels of different diameters, adapted to be moved into or out of frictional engagement or contact with said face wheel or disk, and geared to the saw-mill carriage for operating the same, and I therefore do not claim such combination, broadly and irrespective of the arrangement of said parts; but,

Having now described my invention, I claim—

1. The shaft E, geared to and actuated by the saw-mandrel, and provided with a friction disk or wheel, F, in combination with the shafts G and G′, geared to and operating the carriage, said shafts being mounted in bearings in a sliding box and provided with friction disks or wheels F′ and $F^2$, arranged on opposite sides of the disk and adapted to be moved into or out of contact with the disk F, substantially as and for the purpose described.

2. The combination, in a saw-mill-carriage feed mechanism, of the friction-disk F, secured to one end of a shaft geared to and driven by the saw-mandrel, the friction-disk $F^2$, geared to the saw-mill carriage and made adjustable on its shaft across the face of disk F for varying the feed of the carriage, and means for adjusting said disk $F^2$, substantially as described.

3. The combination, in a saw mill-carriage feed mechanism, of the friction wheel or disk $F^2$, made adjustable across the face of its actuating-disk F for varying the feed of the carriage, and provided with a hub or sleeve having annular cogs or teeth, a lever provided with a toothed segment engaging with said toothed hub or sleeve for adjusting said disk on its shaft, and means for holding said lever at any desired adjustment, substantially as described.

In testimony whereof I have hereunto set my hand this 4th day of December, A. D. 1882.

WALTER J. F. LIDDELL.

Witnesses:
WARREN C. STONE,
REX. SMITH.